Figures 1, 2:
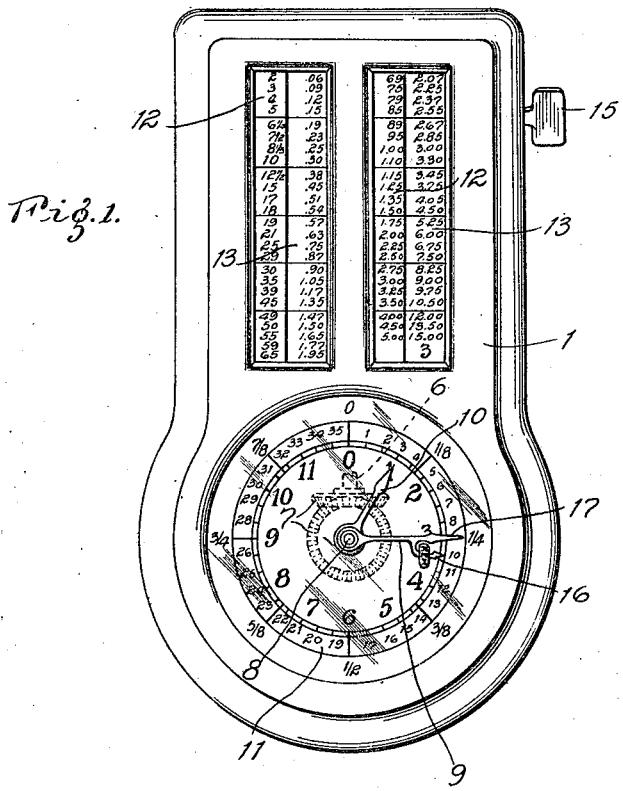

Sept. 9, 1924.   
G. C. HOSCH  
1,508,104

REMNANT INDICATING POINTER FOR MEASURING MACHINES

Filed March 30, 1922

Inventor:
G. Carlton Hosch.
By Elliott & Ammen
Attorneys.

Patented Sept. 9, 1924.

1,508,104

UNITED STATES PATENT OFFICE.

GREENE CARLTON HOSCH, OF ST. LOUIS, MISSOURI, ASSIGNOR TO THE MEASURE-GRAPH COMPANY, OF ST. LOUIS, MISSOURI, A CORPORATION OF DELAWARE.

REMNANT-INDICATING POINTER FOR MEASURING MACHINES.

Application filed March 30, 1922. Serial No. 548,244.

*To all whom it may concern:*

Be it known that I, GREENE CARLTON HOSCH, a citizen of the United States, residing in the city of St. Louis and State of Missouri, have invented new and useful Improvements in Remnant-Indicating Pointers for Measuring Machines, of which the following is a specification.

This invention relates to indicating machines which may be used for measuring under different conditions where the indicated figure or measurement may vary with the nature or condition of the article being measured. The invention is especially applicable to fabric measuring and cost computing machines which may be used either to measure fabric drawn from a roll, or remnants. When the same machine is used for both of these purposes, it is usually calibrated to measure fabric from the roll because this is the principal use of the machine. The machine, therefore, will have an error in an indicated measurement when it is used to measure a remnant, for the reason that the knife which marks the fabric is located beyond the measuring roller with respect to the direction in which the cloth moves; the consequence of this is that in measuring fabric drawn from the roll, the indicating pointer of the machine is actually advanced by the part of the fabric which moves from the measuring roller to the position of the knife. In measuring a remnant, the motion imparted to the measuring roller stops immediately that the end of the fabric has left the face of the measuring roller.

It has been attempted to overcome this difficulty by giving the indicating pointer an added movement when a remnant is measured. Such devices necessitate the use of a number of different parts or mechanisms. The general object of the present invention is to provide simple means for overcoming this difficulty and to provide means on such a machine, whereby the operator can easily read the correct measurement when a remnant is measured and when a piece of fabric has been measured as drawn from a roll.

Further objects of the invention will appear hereinafter.

The invention consists in the novel features, and in the general combination of parts to be particularly described hereinafter, all of which contribute to produce a simple and efficient remnant indicating pointer for measuring machines. A preferred embodiment of my invention will be particularly described in the following specification, while the broad scope of my invention will be pointed out in the appended claims.

In the drawing—

Figure 1 is a plan of a fabric measuring and cost computing machine embodying my invention; and Figure 2 is an elevation showing the rear end of the machine.

In the drawing, 1 represents the casing of a type of machine for measuring and computing the charge to be made for fabric. In operating the machine the fabric is pulled in the direction of the arrow in Figure 2 through a gap or throat 2 in the casing, so that the fabric passes between a measuring roller and a presser roller 4 which is pressed against the face of the measuring roller during the measuring movement. The shaft 5 of the measuring roller, through suitable driving mechanism, actuates a driven shaft 6 mounted in the upper part of the casing, and through beveled gears 7, this shaft drives a tubular spindle or tubular shaft 8, the upper end of which carries a fast moving pointer 9. Through suitable reduction gearing, not illustrated, the spindle 8 actuates a slow moving pointer 10. These pointers co-operate with a scale 11 which has large figures, extending from 1 to 11, for indicating a unit of measurement such as a yard, and the scale also has a row of figures extending from 1 to 35 with corresponding equal divisions which co-operate with the fast moving pointer 9 to indicate inches.

The machine illustrated also is provided on its upper side with price scales 12, bearing numbers indicating different prices per yard and these scales co-operate with rows of figures on two movable charts 13 which are driven synchronously with the hands or pointers 9 and 10, to indicate the charges to be made for the length measured, at the different price rates.

Before starting a measurement, the operator aligns the forward edge of the fabric with a marking device or blade such as the blade 14, indicated in Figure 2, toward one side of the casing and in the gap 2. Having let the presser roller 4 down onto the fabric, the operator then pulls the fabric through the machine so that it passes between the rollers 3 and 4. When the desired amount has been measured off, the goods are marked by means of a knife or marking means co-operating with the blade 14 and actuated by a thumb plate 15.

In measuring in this way from a roll of fabric, it will be evident that the measurement starts at the blade 14 and ends at the blade 14; in other words, the machine correctly indicates the amount of fabric which has been drawn past the blade 14 or, which is the same thing, the amount of fabric which has been drawn past the point of contact of the rollers 3 and 4.

When a remnant is being measured, however, the advancement of the measuring roller ceases as soon as the last edge of the remnant passes the contact point of the rollers. Hence, as compared with a piece measured from a roll, the remnant will indicate an amount which will be too short, by the distance between the contact point of the rollers and the blade 14. In order to overcome this discrepancy and enable the machine to measure a remnant correctly, I provide the hand or pointer 9 with means to co-operate with the scale to measure a piece of goods drawn off a roll, and additional means to indicate the length of a measured remnant. For this purpose I provide the pointer or hand 9 with an auxiliary pointer 16 in addition to its main or regular point 17. In the machine illustrated, the distance between the blade 14 and the contact point of the rollers is one inch. This auxiliary pointer on the hand 9, therefore, indicates ten inches when the hand 9 indicates nine inches on the scale (see Figure 1) and I prefer to provide the auxiliary point with means for indicating that it is used merely to indicate the length of remnants measured. This may consist simply of a plate secured to the auxiliary pointer and carrying the abbreviation "Rem."

The auxiliary point or pointer 16 is very much smaller than the main point 17 of the hand and there is, therefore, no danger of its being confused with the main point or pointer, and hence in the principal use of the machine, the operator simply disregards the pointer 16. When measuring a remnant, however, the operator simply disregards the pointer 17 and reads the measurement from the auxiliary pointer 16.

It is understood that the embodiment of the invention described herein is only one of the many embodiments my invention may take, and I do not wish to be limited in the practice of my invention nor in my claims, to the particular embodiment set forth.

What I claim is:—

1. In a machine for measuring the length of remnants, or of fabric pulled from a roll, and having a measuring roller, and a marker for the measured fabric located beyond said roller in the direction of the pull of the fabric, the combination of a length indicating scale, a pointer movable over said scale for indicating the length of a piece of fabric drawn from a roll, and an auxiliary pointer fast with said pointer and having its indicating point located at a distance from the indicating point of said pointer to represent a plus measurement to the amount indicated by said pointer corresponding to the distance between the axis of said roller and said marker.

2. In a machine for measuring the length of remnants, or of fabric pulled from a roll, and having a measuring roller, and a marker for the measured fabric located beyond the measuring roller in the direction of the pull of the fabric, the combination of a length indicating scale, and a pointer having two indicating points mounted to move over said scale, one of said points indicating measurements of fabric drawn from a roll, and the other of said points being spaced at a distance from the first to indicate on said scale a plus measurement corresponding to the distance between the axis of said roller and said marker, for indicating the length of a remnant measured by the machine.

In testimony whereof, I have hereunto set my hand.

GREENE CARLTON HOSCH.